US012675454B2

(12) United States Patent
Shilane

(10) Patent No.: US 12,675,454 B2
(45) Date of Patent: *Jul. 7, 2026

(54) FINGERPRINT UPGRADE PROCESS FOR CLUSTER FILE SYSTEMS WITH DELETION WHILE UPGRADING

(71) Applicant: Dell Products L.P., Round Rock, TX (US)

(72) Inventor: Philip Shilane, Newtown, PA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/984,073

(22) Filed: Dec. 17, 2024

(65) Prior Publication Data

US 2026/0161604 A1    Jun. 11, 2026

Related U.S. Application Data

(63) Continuation of application No. 18/972,003, filed on Dec. 6, 2024.

(51) Int. Cl.
*G06F 16/16* (2019.01)
*G06F 16/13* (2019.01)

(52) U.S. Cl.
CPC .......... *G06F 16/162* (2019.01); *G06F 16/137* (2019.01)

(58) Field of Classification Search
CPC .................................................. G06F 16/215
See application file for complete search history.

(56) References Cited

U.S. PATENT DOCUMENTS

| | | | | |
|---|---|---|---|---|
| 10,235,396 | B2 * | 3/2019 | Ioannou | ................ G06F 16/215 |
| 10,983,867 | B1 * | 4/2021 | Zhang | ................ G06F 11/1448 |
| 11,411,811 | B2 | 8/2022 | Paradkar | |
| 12,413,491 | B2 | 9/2025 | Vegas | |
| 2008/0034003 | A1 | 2/2008 | Stakutis | |
| 2008/0301783 | A1 | 12/2008 | Abrutyn | |
| 2017/0060897 | A1 | 3/2017 | Madaan | |
| 2017/0155622 | A1 | 6/2017 | Vazquez | |
| 2019/0028552 | A1 | 1/2019 | Johnson | |
| 2020/0348973 | A1 | 11/2020 | Kutch | |
| 2021/0006613 | A1 | 1/2021 | Voss-Wolff | |
| 2021/0168150 | A1 | 6/2021 | Ross | |
| 2021/0306899 | A1 | 9/2021 | Mishra | |
| 2021/0342193 | A1 | 11/2021 | Anand | |
| 2022/0147542 | A1 | 5/2022 | Asgar | |
| 2022/0414026 | A1 | 12/2022 | Iyer | |

(Continued)

*Primary Examiner* — Maher N Algibhah
(74) *Attorney, Agent, or Firm* — Staniford Tomita LLP

(57) ABSTRACT

Updating fingerprints for deduplicated data segments in a cluster network by calculating new fingerprint hash values using a new hash process. A new index mapping from the present hash process to the new hash process is created, as is a new fingerprint index mapping from the updated hash process to the containers. The process generates new fingerprints with the new fingerprint hash, and calculates the new fingerprint hash values of the new data segments using the new hash process. Relevant data structures are updated using the current fingerprint hash values with the new fingerprint hash values. New containers are created as needed to store the new fingerprint hash values. Old data elements like containers and fingerprints are deleted during the upgrading process to reduce space overheads.

17 Claims, 9 Drawing Sheets

(56) References Cited

U.S. PATENT DOCUMENTS

| | | | |
|---|---|---|---|
| 2023/0217273 | A1 | 7/2023 | Viswambharan |
| 2023/0222043 | A1 | 7/2023 | Lee |
| 2023/0236922 | A1 | 7/2023 | Nagar |
| 2023/0244475 | A1 | 8/2023 | Holowaty |
| 2023/0300218 | A1 | 9/2023 | Karthikeyan |
| 2023/0362236 | A1 | 11/2023 | Nair |
| 2023/0393547 | A1 | 12/2023 | Leroy |
| 2023/0409369 | A1 | 12/2023 | Liu |
| 2024/0214294 | A1 | 6/2024 | Miriyala |
| 2024/0223454 | A1 | 7/2024 | Miriyala |
| 2024/0235970 | A1 | 7/2024 | Sandhaus |
| 2024/0354290 | A1 | 10/2024 | Scott |
| 2024/0403137 | A1 | 12/2024 | Rao |
| 2024/0406277 | A1 | 12/2024 | Henkel |
| 2024/0421979 | A1 | 12/2024 | Kenchaiah |
| 2025/0219894 | A1 | 7/2025 | Gupta |

* cited by examiner

400

| CMETA<br>List of Fingerprints<br>and other Metadata<br>about the Container<br>402 | Data Segments Packed into Compression Regions within the<br>Container<br><br>404 |
|---|---|

Fingerprint Index

502

Fp -> CID

0x00 -> 15
0x01 -> 13
0x05 -> 17
0x08 -> 02
⋮
0xf3 -> 16

502

504    Fingerprint Index Buckets

Fp -> CID

0x00

Fp -> CID

0x01

...

Fp -> CID

0xff

600

Upgrade from SHA1 fingerprints to SHA2 fingerprints begins. Customer reads and writes can continue. Some performance degradation is expected.

Santorini Cluster with SHA-1 fingerprints

602

Santorini Cluster undergoing fingerprint update
604

Santorini Cluster with SHA-2 fingerprints

606

User performs reads and writes
608

700

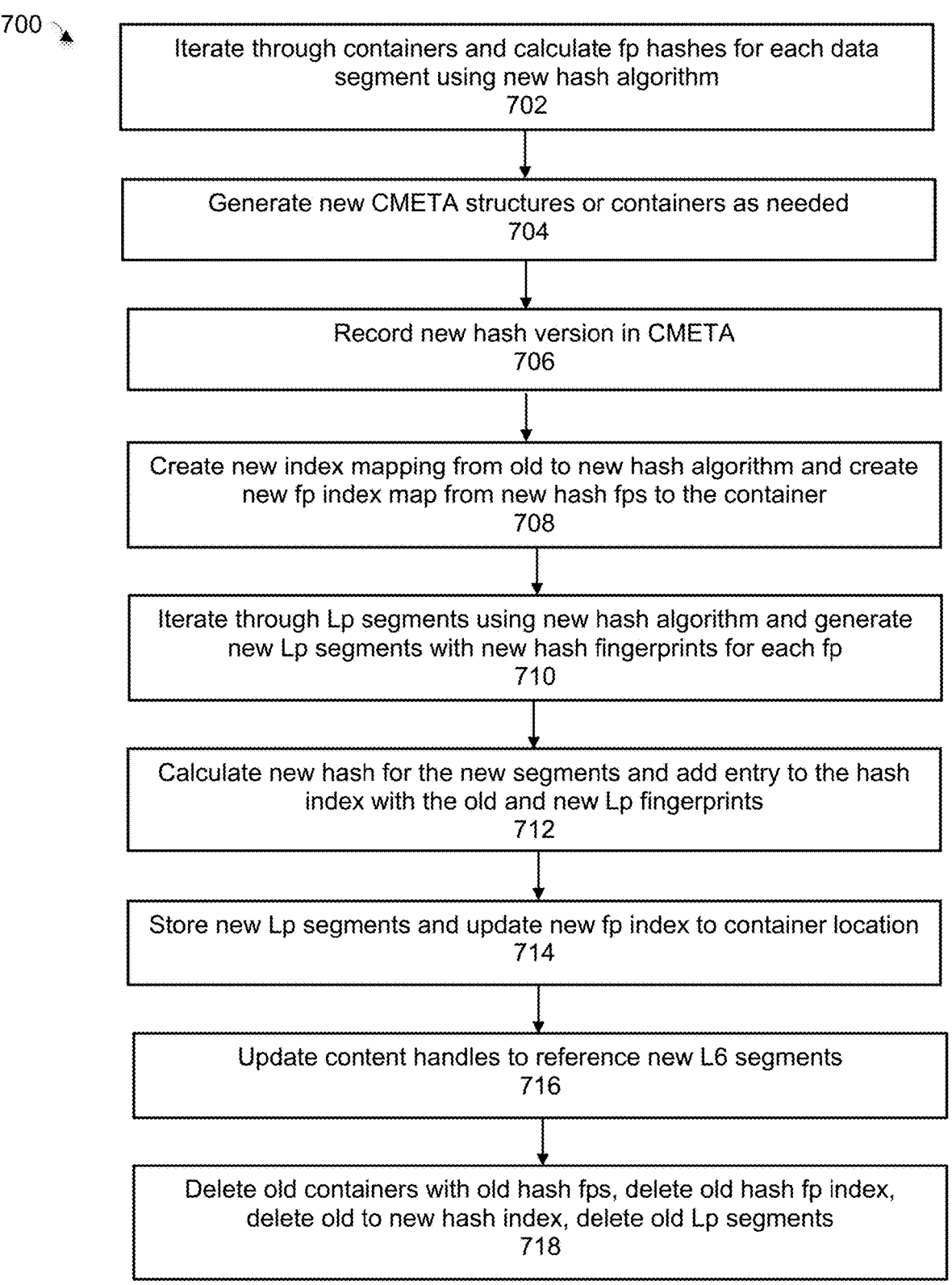

Iterate through containers and calculate fp hashes for each data segment using new hash algorithm
702

Generate new CMETA structures or containers as needed
704

Record new hash version in CMETA
706

Create new index mapping from old to new hash algorithm and create new fp index map from new hash fps to the container
708

Iterate through Lp segments using new hash algorithm and generate new Lp segments with new hash fingerprints for each fp
710

Calculate new hash for the new segments and add entry to the hash index with the old and new Lp fingerprints
712

Store new Lp segments and update new fp index to container location
714

Update content handles to reference new L6 segments
716

Delete old containers with old hash fps, delete old hash fp index, delete old to new hash index, delete old Lp segments
718

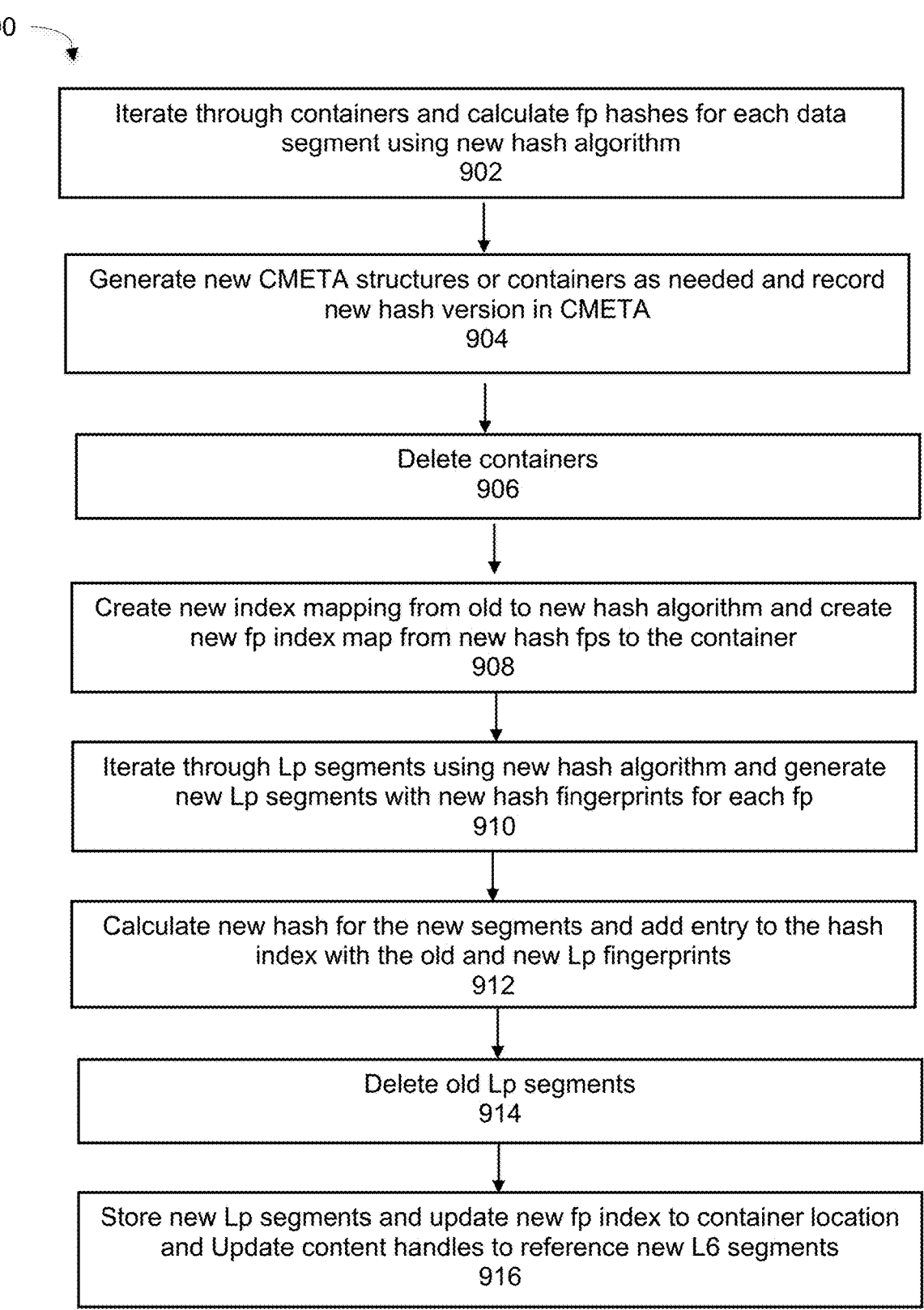

Iterate through containers and calculate fp hashes for each data
segment using new hash algorithm
902

Generate new CMETA structures or containers as needed and record
new hash version in CMETA
904

Delete containers
906

Create new index mapping from old to new hash algorithm and create
new fp index map from new hash fps to the container
908

Iterate through Lp segments using new hash algorithm and generate
new Lp segments with new hash fingerprints for each fp
910

Calculate new hash for the new segments and add entry to the hash
index with the old and new Lp fingerprints
912

Delete old Lp segments
914

Store new Lp segments and update new fp index to container location
and Update content handles to reference new L6 segments
916

FIG. 9

FINGERPRINT UPGRADE PROCESS FOR CLUSTER FILE SYSTEMS WITH DELETION WHILE UPGRADING

CROSS-REFERENCE TO RELATED APPLICATIONS

This application is a Continuation-in-Part application of U.S. patent application Ser. No. 18/972,003 filed on Dec. 6, 2024 and entitled "Fingerprint Upgrade Process for Cluster File Systems," which is assigned to the assignee of the present application, and which is hereby incorporated by reference in its entirety.

TECHNICAL FIELD

Embodiments are directed to distributed networks, and more specifically to automatically upgrading data segment fingerprints for deduplicated backup systems.

BACKGROUND

A distributed (or cluster) network runs a filesystem in which data is spread across multiple storage devices as may be provided in a cluster of nodes. Cluster networks represent a scale-out solution to single node systems by providing networked computers that work together so that they essentially form a single system. The filesystem is shared by being simultaneously mounted on multiple servers so that a distributed filesystem can present a global namespace to clients (nodes) so that files appear to be in the same central location. The Santorini filesystem represents a type of cluster system that stores the file system metadata on a distributed key value store and the file data on object store. The file/namespace metadata can be accessed by any front end node, and any file can be opened for read/write operations by any front-end node.

One major application implemented on a cluster network is a deduplicated backup system that eliminates redundant copies of data to reduce storage requirements. Data compression methods are used to store only one unique instance of data by replacing redundant data blocks with pointers to the unique data copy. As new data is written to a system, duplicate chunks are replaced with these pointer references to previously stored data. The Data Domain File System (DDFS) is an example of an inline data deduplication filesystem. As data gets written to the filesystem, DDFS breaks it into variable sized segments and a group of segments are packed in a compression region, and a fingerprint signature (hash value) is calculated for segments of compression regions and serves as a pointer reference to the original data. Many current systems utilize hash functions in accordance with the SHA-1 (Secure Hash Algorithm 1) standard, which takes an input and produces a 160-bit hash value.

As cluster networks are maintained into the future, present fingerprinting techniques are increasingly vulnerable to compromise through cyber-attacks. Consequently, it is highly likely that hashing algorithms for fingerprinting will evolve and change in response by government and corporate initiatives to maintain data security. In fact, SHA-1 has already been replaced by SHA-2 for data transfers under federal requirements, and other algorithms such as SHA-3 and SHA-256 are being incorporated as well. What is needed, therefore, is a way to automatically upgrade hashing methods for fingerprint calculations to accommodate ever developing hashing algorithms.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 7 is a flowchart that illustrates a fingerprint updating process for cluster networks, under some embodiments.

FIG. 9 is a flowchart that illustrates a fingerprint updating process that deletes while updating, under some embodiments.

DETAILED DESCRIPTION

Figure 1:
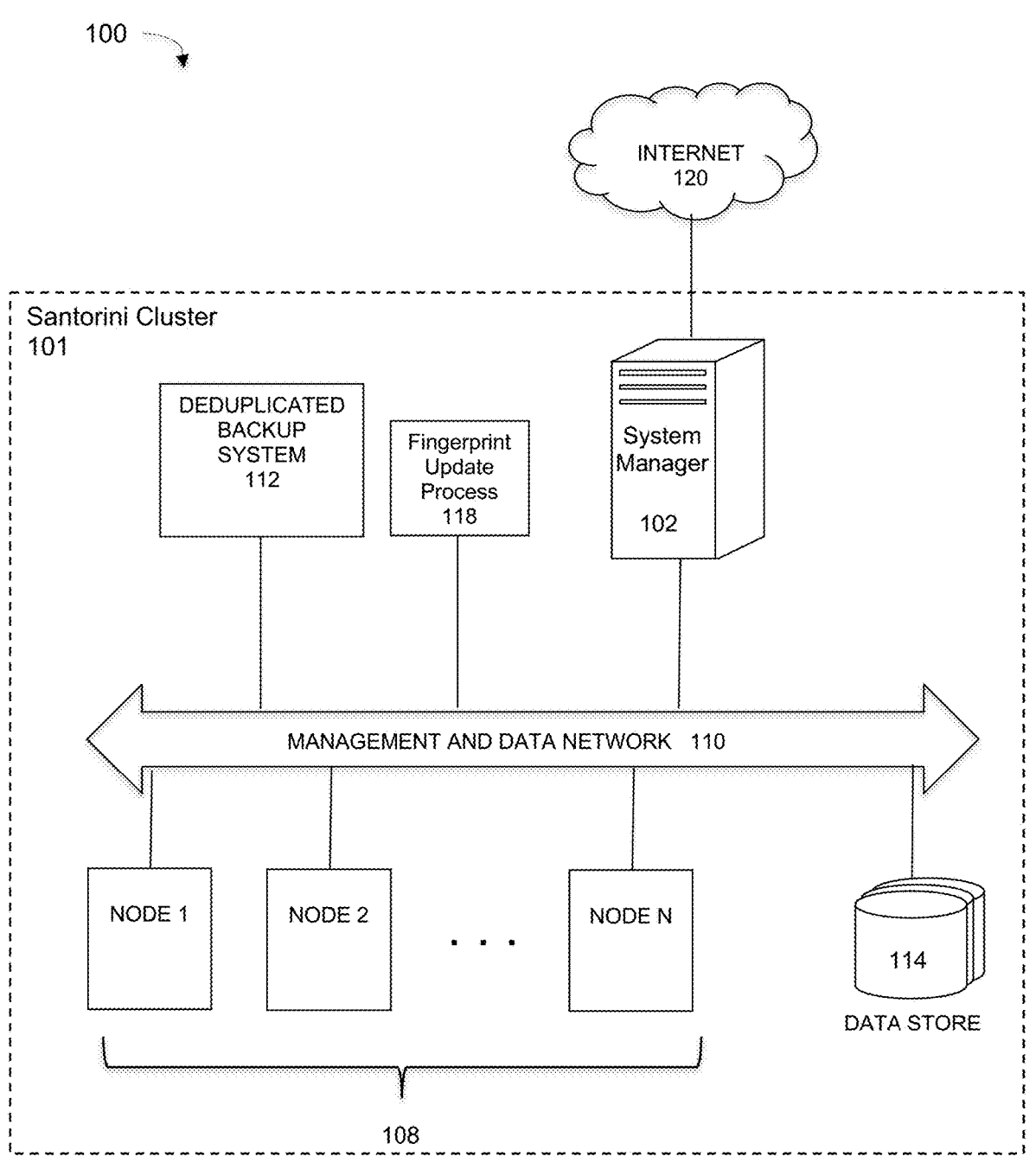
FIG. 1 is a block diagram illustrating a deduplicated backup system in a cluster network implementing an automatic fingerprint upgrade process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to systems and methods for automatically updating data segment fingerprint hash algorithms for deduplicated backups in cluster network filesystems.

FIG. 1 is a block diagram illustrating a deduplicated backup system in a cluster network implementing an automatic fingerprint upgrade process, under some embodiments. System 100 comprises a large-scale network that includes a cluster network 101 having a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system 101 (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and a connection manager 102 through network 110. The connection manager can control automatic failover for high-availability clusters, monitor client connections and direct requests to appropriate servers, act as a proxy, prioritize connections, and other similar tasks.

In an embodiment, cluster network 101 may be implemented as a Santorini cluster that supports applications such as a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components. The data backup system may comprise a Data Domain system, in which case the Santorini network 101 supports various related filesystem and data managers, such as PPDM, as well as services such as ObjectScale and other services.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell Technologies, Inc.

Cluster network 101 includes a network 110 and also provides connectivity to other systems and components, such Internet 120 connectivity. The networks may be implemented using protocols such as Transmission Control Protocol (TCP) and/or Internet Protocol (IP), well known in the relevant arts. In a cloud computing environment, the applications, servers and data are maintained and provided through a centralized cloud computing platform.

In an embodiment, system 100 uses Kubernetes as an orchestration framework for clustering the nodes 1 to N in FIG. 1. Containerization is an OS-level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures. In Kubernetes, a pod is the smallest deployable data unit that can be created and managed and constitutes a group of one or more containers, with shared storage and resource requirements.

As shown in FIG. 1, network 101 includes a deduplicated backup system 112. This may be implemented by a specialized node in system 100. Alternatively, it may be executed as a server process, such as by server 102 or any other server or client computer in the system. Such a system can be used to implement a Data Domain (deduplication backup) process that uses object storage (e.g., Dell ObjectScale), Kubernetes, and different types of storage media, such as HDD, Flash memory, SSD memory, and so on. In an embodiment, a PowerProtect Data Manager (PPDM) microservices layer builds on the Data Domain system to provide data protection capabilities for VM image backups and Kubernetes workloads. Santorini exposes a global namespace that is a union of all namespaces in all domains. Distributed key value (KV) stores are also a component of Santorini and are used to hold much of the metadata such as the namespace Btree, the Lp tree, fingerprint index, and container fingerprints.

The Data Domain File System (DDFS) from DellEMC is an example deduplication filesystem in which the filesystem anchors and segments data as it is ingested. The filesystem keeps track of segments which are stored on the disk, and if the segments are accessed again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

Embodiments are generally described with respect to Data Domain File System (DDFS) backup environments, however, embodiments are not so limited and any other type of deduplication (or deduplicated) filesystems may also be used. The Data Domain File System (DDFS) is an example of an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using the SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated filesystem that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
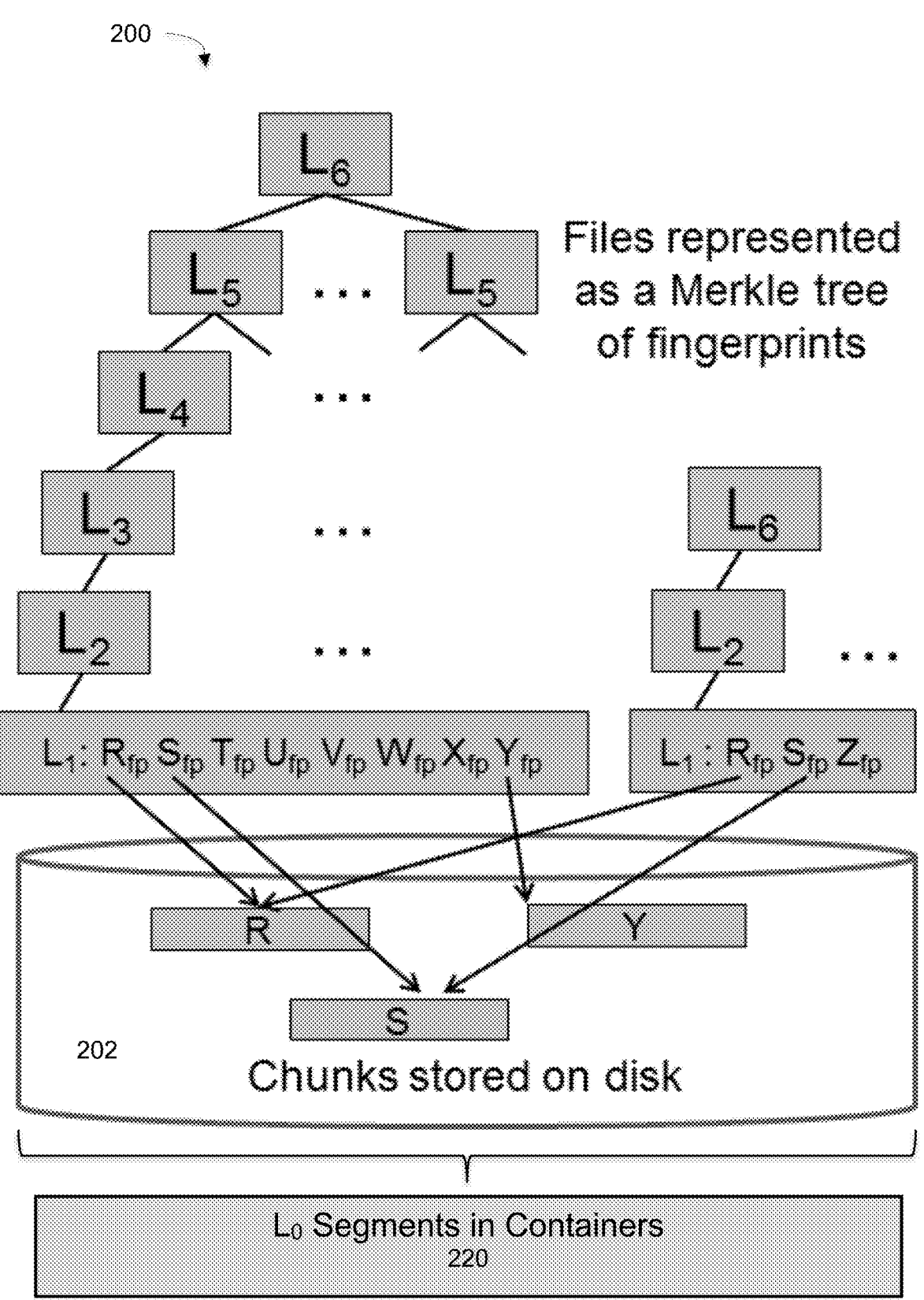
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as L0, meaning the lowest level of the tree. This data as stored on the disk represents the $L_0$ segments in the containers 220.

Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical LP chunks. As this operation involves only the root of the tree, it is trivially fast and does not increase physical space in use beyond the one chunk containing the $L_6$.

Figure 3:
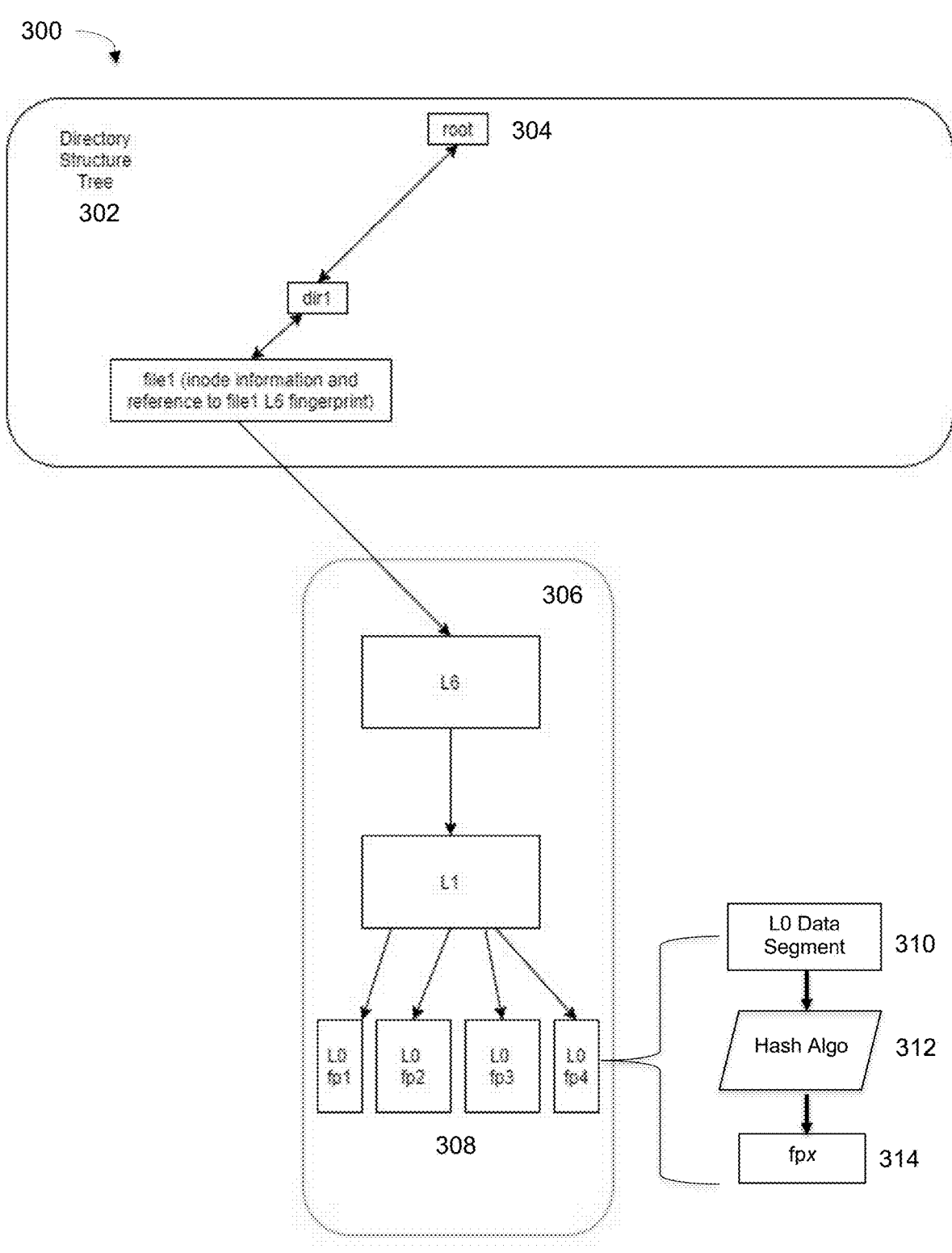
FIG. 3 illustrates a Data Domain filesystem Merkle tree accessed by a file under an example embodiment.

FIG. 3 illustrates a DDFS Merkle tree accessed by a file under an example embodiment. As shown in system 300, a directory structure tree 302 comprises a root directory 304, which accesses a directory (dir1) that holds a particular file (file1). The directory tree data for file1 comprises inode information and a reference to the file1 L6 fingerprint in the associated Merkle tree 306.

As mentioned above, the data chunks directly written to disk are referred to as $L_0$, meaning the lowest level of the tree and which hold the respective fingerprints (fp1 to fpn). Consecutive $L_0$ chunks 308 are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough to not need intermediate nodes. The $L_1$-$L_6$ chunks are referred to as $L_p$ chunks, where p is a parameter that ranges from 1 to 6 and indicates metadata representing the file. Deduplication takes place because a chunk can be referenced multiple times.

For the embodiments described above, as data is written into a deduplicated storage system, it is divided into segments (fixed or variable sized) and represented by a fingerprint (fpx). The fingerprint consists of a SHA-1 hash over the segment and possibly other fields such as a segment size, XOR over the bytes, etc. In general, the terms a "SHA-1 fingerprint" or "SHA-2 fingerprint" mean that the hash used in the fingerprint is generated using the SHA-1 or SHA-2 algorithm without specifying what other fields are part of the fingerprint. The fingerprint is a unique identifier for deduplication purposes and is used to identify segments needed to reconstruct a file during a file read (i.e., data recovery).

FIG. 3 illustrates a process of generating the fingerprints (fp) by inputting the L0 data segments 310 into the hash algorithm (e.g., SHA-1) 312 that then produces a hash of the data segment value to produce a corresponding fingerprint fpx, 314.

In general, the hash is calculated immediately after a segment is formed and is used for verifying segment validity later. By recalculating the hash of the data and comparing it to the previously stored hash, a data corruption can be detected if the hashes differ. The hash may be calculated using a software algorithm, or it may be calculated using specialized CPU instructions provided by a CPU manufacturer. The hash algorithm needs to be a standardized and secure algorithm so that software running on different systems will produce the same hash given the same input.

In an embodiment, the deduplicated storage system has three main data structures that depend heavily on fingerprints. These are the container metadata, fingerprint index, and Lp tree (or file recipe).

With respect to the container metadata, after performing deduplication on incoming segments, all remaining segments are stored to persistent storage. They are grouped into buffers, compressed, and packed into a fixed-sized container. The container size depends on properties of the underlying storage layer and may be aligned to a RAID stripe size or other consistent size used for efficient I/O. As an example, the containers in a Santorini system are of 16 MB size to align with the ObjectScale chunk size used for erasure coding. Other similar sizes are also possible, however.

Figures 4, 5A, 5B:
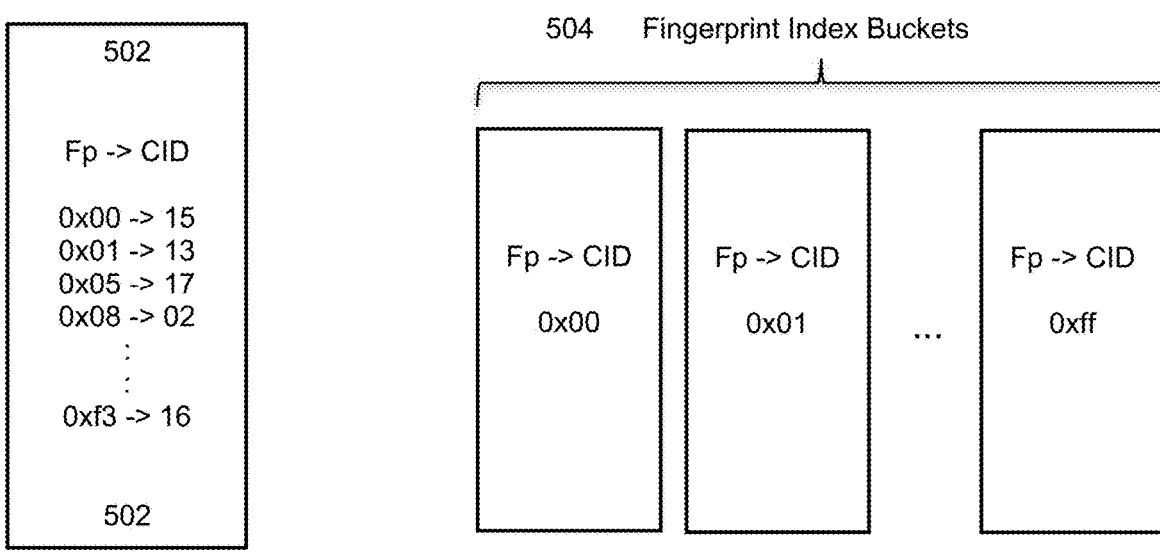
FIG. 4 illustrates an example container layout for use in a fingerprint upgrade process for deduplicated backup systems in cluster networks, under some embodiments.
FIG. 5A illustrates a simplified fingerprint index under an example embodiment.
FIG. 5B illustrates a bucketized version of a fingerprint index, under an example embodiment.

FIG. 4 illustrates an example container layout for use in a fingerprint upgrade process for deduplicated backup systems in cluster networks, under some embodiments. Data element 400 of FIG. 4 represents a container that comprises a section 404 allocated for compressed data segments, along with a metadata section 402 holding fingerprints and other metadata about the segments in the container. This is referred to as container metadata (CMETA), and it may be stored as part of the container 400, as shown in FIG. 4, or separately from the container, or the CMETA could be stored both with the container and separately for efficient lookups from faster media.

When the fingerprinting hash algorithm is updated, such from SHA-1 to SHA-2, the container metadata needs to be rewritten with new SHA-2 fingerprints. In designs where the CMETA 402 is part of a container 400, the container itself will need to be rewritten. This effect can potentially overflow into multiple containers, and thus present a significant operation.

Another data structure implicating fingerprints is the fingerprint index, which records where segments are stored in the system. A fingerprint index basically provides a mapping from fingerprints to a container or containers. Other data structures then map from the container to a physical location in storage.

There are multiple ways to implement a fingerprint index. FIG. 5A illustrates a simplified fingerprint index under an example embodiment. The simplified fingerprint index 502 shows a mapping from fingerprint to container ID (CID). The fingerprint comprises a hexadecimal number (e.g., 0x01) and container ID (CID) is shown as a decimal value (e.g., 13). However, this may actually be a more complex record with container ID, compression region offset, compression region size, etc. During deduplication and file reads, the fingerprint index is checked to identify whether the fingerprint and its associated segment have been stored, and where the segment is stored. There should be a one-to-one mapping between fingerprints in the container metadata 402 and the fingerprint index 502.

The other common way to implement a fingerprint index is as a set of buckets. FIG. 5B illustrates a bucketized version of a fingerprint index, under an example embodiment. In this embodiment, the fingerprint index is stored as a set of buckets 504, where a subset of the fingerprint index records are stored within each bucket. A few bytes from the fingerprint are used to identify which bucket to load and check. FIGS. 5A and 5B illustrate only two example variations of the fingerprint index, and there may be other variants of the fingerprint index such as a short-fingerprint version that is loaded in faster access storage as an optimization.

Updating fingerprints for a new hash algorithm (e.g., SHA-1 to SHA-2) requires the fingerprint index and related structures to be rewritten.

As stated above, the third main data structure implicating fingerprints is the file recipe or Lp Tree. A file is commonly represented in Santorini (and similar cluster systems) by a sequence of fingerprints referencing its segments, where the filesystem creates a tree structure on this sequence of fingerprints to accelerate random I/O operations. As shown in FIGS. 2 and 3, data segments are referred to as L0 segments since they are the bottom of a metadata tree representing the file. Fingerprints to those L0 segments are grouped in order and stored in L1 segments. Fingerprints referencing L1 segments are similarly grouped in order and stored in L2 segments. The overall Lp tree (e.g., 200 or 306) represents the file recipe, where the files are represented as a Merkle tree of fingerprints.

In this case, updating fingerprints for a new hash algorithm (e.g., SHA-1 to SHA-2) requires that all Lp trees will be rewritten with the updated fingerprints.

In practical cluster networks, when updating the hash function for fingerprinting for any of the above described (or other) data elements, there are several overall constraints that must be considered, such as data availability, space limitations, and resource overhead.

As a first requirement, then, the upgrade must maintain file availability after the hash algorithm update without any loss of customer data. Depending on customer requirements, it may be acceptable to take the system offline for this major upgrade of the system. Alternatively, it may be sufficient and necessary to maintain data availability for just the reads during the upgrade. In other cases, it may be necessary to maintain data availability for both concurrent reads and writes during the fingerprint update.

As mentioned, the second consideration is space related. A hash algorithm update will almost always require more space both temporarily and during eventual deployment given increased code size, data elements, and so on. For example, switching from a SHA-1 (20 bytes) to a SHA-2 (32 bytes) algorithm requires larger CMETA, fingerprint index, and Lp trees in the long term. Although the data segments 404 are usually seen as constituting the majority of container storage space, metadata can be a significant fraction, particularly in high deduplication scenarios. Furthermore, in the short term period of the update, there may be both present and early (e.g., SHA1 and SHA2) versions of at least some data structures during the update process, and these overheads should be minimized.

The third consideration for the hash algorithm update is the resource overhead needed to complete the update. For example, if reads and writes to the system need to be disabled during upgrade, it would be required to minimize this downtime. Even if the system can perform reads and writes while updating the fingerprint hash, there will likely be computational and I/O overheads while updating data structures, and this can potentially impact system performance significantly.

With respect to the space-related consideration mentioned above, in an embodiment, the system estimates how much space is needed both in the long term and short term before starting an update. The space overhead depends on several variables, such as the logical size (L) of user-written content, and physical size (P) of the data after deduplication without indexes and metadata. The data segment_size=average size of data segments, such as 8 KB. The average_local_compression_ratio=average compression ratio of the compression algorithm (e.g., LZ or GZ), and is typically around 2.

The number of segments is calculated by the following equation:

$$\text{Number\_of\_Segments} = P/(\text{segment\_size}/\text{average\_local\_compression ratio})).$$

The total physical size (TP) is the data size after deduplication and local compression, and includes indexes and metadata. The total compression ratio (C) is the logical size of user-written content divided by size after deduplication and local compression (L/TP). For this relationship, values greater than 1 indicate more space savings. For the deduplication ratio (D), L/P values greater than 1 also indicate more space savings.

The size of the record could be the size of fingerprint plus the size of the container ID plus any other metadata needed for a record such as compression region offset and size. This is calculated by the following equation:

$$\text{Fingerprint Index Size} = \text{size\_of\_record} * \text{number\_of\_segments}.$$

Using a larger hash value increases the fingerprint size. The size of a new index relative to the old index is calculated as:

$$(\text{size\_of\_new\_record} * \text{number\_number\_of\_segments})/(\text{size\_of\_old\_record} * \text{number\_of\_segments}) = \text{size\_of\_new\_record}/\text{size\_of\_old\_record}.$$

The hash value is only one part of the record size.

The number_of_Lp_segments is equal to approximately L divided by the segment_size, and this only includes L1 segments and not the upper part of the Merkle tree, but is generally a reasonable approximation.

The Total_Lp_segment_size is equal to approximately the number_Lp_segments times the Lp_segment_size. The Lp_segment_size will increase with a new hash function, so the total_Lp_segment_size relative to the old index is calculated similarly to the equation above and reduces to new_Lp_segment_size/old_lp_segment_size.

The SHA1-to-SHA2 index size is as follows:

$$\text{Number\_of\_segments} * \text{SHA1-to-SHA2\_record\_size}.$$

The SHA1-to-SHA2_record size is approximately equal to the size of a SHA1 hash plus the size of a SHA2 hash.

The long-term new size can be approximated as the size of the new fingerprint index plus the size of the new Lp segments. The new fingerprint index is larger than the old fingerprint index as follows:

$$\text{Size\_of\_new\_record}/\text{size\_of\_old\_record} * \text{old\_}fp\_\text{index\_size}.$$

The size of the new Lp segments is larger than the old Lp segments as follows:

$$\text{new\_}Lp\_\text{segment\_size}/\text{old\_}Lp\_\text{segment\_size} * \text{total\_old\_}Lp\_\text{segment\_size}.$$

The size of the increased space for containers is not factored in these calculations, but can be if necessary. For each system, these values can be measured before running the fingerprint upgrade, and such a calculation should be made to determine if there is space to complete the fingerprint upgrade. Besides the long-term space requirements, there is also the short-term (or temporary) space requirement for the SHA1-to-SHA2 index that exists while the upgrade takes place and can then be deleted to regain this space.

Figure 6:
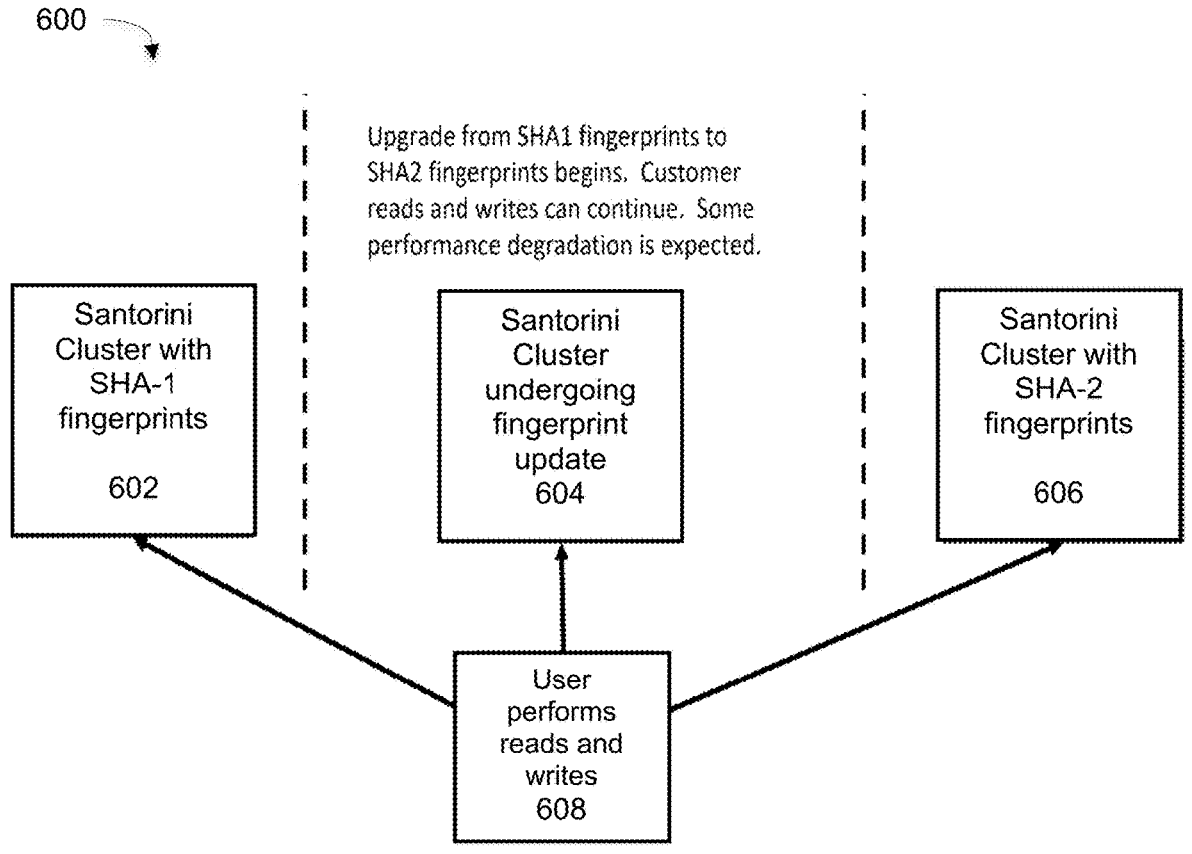
FIG. 6 illustrates an impact on system performance during an fingerprint update process, under some embodiments.

FIG. 6 illustrates an impact on system performance during an fingerprint update process, under some embodiments. Diagram 600 of FIG. 6 illustrates different states of the cluster network while it undergoes an update (or upgrade) of the fingerprint hash algorithm from SHA-1 to SHA-2, for example. State 602 illustrates the cluster network using SHA-1 based fingerprints and state 606 illustrates the cluster network using new SHA-2 based fingerprints. In between these two states is the update process as the cluster network undergoes the fingerprint update, 604. During this process, the user may perform read and write operations on the cluster network, 608. As mentioned above, the update process uses and imposes certain constraints on the system, thus during the update state 604 from SHA-1 to SHA-2, the user read and write operations may continue, but some performance degradation is likely to occur, as well as other effects, such as increased space usage, and so on.

Embodiments include a fingerprint update process that performs a hash algorithm update attempts to minimize system impact. This may be provided by a fingerprint update processing component 118 as shown in system 100 of FIG. 1, and that may be embodied as a component in the cluster network 101, or as a process executed by the deduplicated backup system 112, or as an external process.

FIG. 7 is a flowchart that illustrates a fingerprint updating process for cluster networks, under some embodiments. The example of FIG. 7 describes an update from SHA-1 to SHA-2 as the hash algorithm for the fingerprints, though it should be noted that any current and next hash algorithm can be used, such as from SHA-2 to SHA-3 or SHA-256, and so on.

Process 700 starts by iterating through the containers and calculates new SHA2 hashes for each segment. Since it is not best practice to update containers in-place, and more space is likely needed for a larger hash, new containers (or CMETA structures at least) are generated by this process, 704. The hash version of the new hash algorithm is recorded in the version information section of the CMETA structure, 706. While creating SHA-2 hashes, the system creates a new index mapping from the SHA-1 hash to the SHA-2 hash, and creates a new fingerprint index mapping from the SHA-2 fingerprints to the container, 708.

The new index that maps from SHA2 fingerprints to containers is identical to those shown in FIGS. 5A and 5B, though with SHA2 fingerprints instead of SHA1 fingerprints. The SHA1-to-SHA2 hash mapping is generated as the containers are converted. When processing segments in a container, the known SHA1 hashes are used to calculate the new SHA2 hashes. A new index from SHA1-to-SHA2 is created with this information. This index is used when upgrading the Lp segments because they consist of sequences of SHA1 fingerprints without the content easily accessible. The SHA1-to-SHA2 index is thus used to create the new Lp segments with SHA2 fingerprints. The SHA1-to-SHA2 index can be removed when upgrade is complete.

With reference back to FIG. 7, the process 700 iterates through the Lp segments from L1 up towards L6. Each Lp segment has an array of fingerprints referencing the lower-level segments. For each fingerprint, the system looks it up in the SHA-1 to SHA-2 index, and generates a new Lp segment with SHA2 fingerprints, 710.

In step 712, the system calculates a SHA-2 hash for the new Lp segment and adds an entry to the SHA-1 to SHA-2 index with the old and new Lp fingerprint. It then stores the new Lp segment and update the SHA2 fingerprint index to the container location, 714. If the Lp segment is stored in a key-value store or other structure, those structures are also updated accordingly.

The process then continues steps 710 to 714 as it iterates up towards the L6 segments.

After the iterations over the containers (702) and Lp segments (710), the system updates the content handles to reference the new L6 segments, 716. It then deletes: the old containers (or CMETAs) with SHA1 hashes, the SHA1 fingerprint index, and the SHA-1 to SHA-2 index, as well as the old Lp segments if they are not already deleted from containers, 718. Users can continue to read files while the upgrade progresses since the old containers and Lp segments are deleted at the end.

Figure 8:
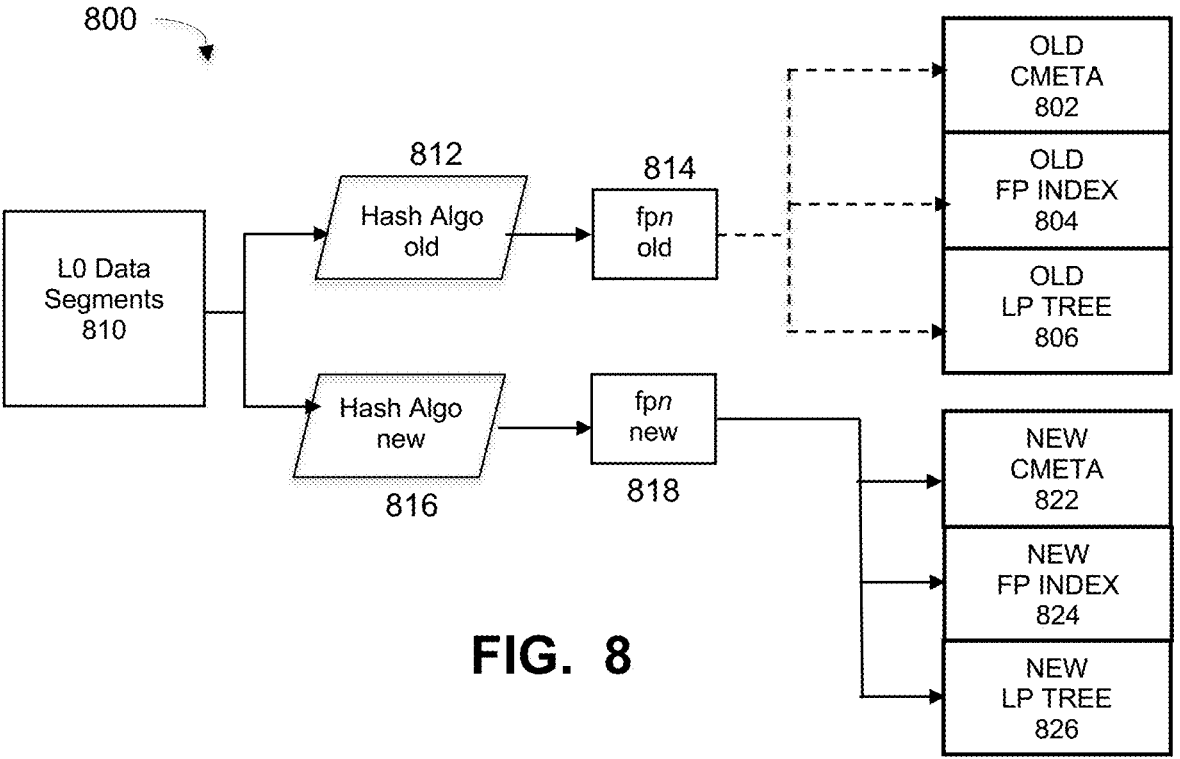
FIG. 8 graphically illustrates the updating of fingerprints from an old hash algorithm to a new algorithm, under an example embodiment.

FIG. 8 graphically illustrates the updating of fingerprints from an old hash algorithm to a new algorithm, under an example embodiment. As shown in diagram 800, sets of L0 data segments 802 are first hashed using a present (or old) hash algorithm to produce old fingerprints 814. These fingerprints are then initially used for certain relevant data elements, such as container metadata 802, fingerprint index 804 and Lp tree 806. Upon an upgrade to use a new hash algorithm 816, the data segments 810 are hashed again using this algorithm to produce new fingerprints 818. These fingerprints then replace the old fingerprints 814 in the new data elements 822, 824, 826 to replace the old data elements 802, 804, and 806. This process is iterated over all of the Lp segments for all of the containers, as shown in process 700.

Depending on the system configuration and capabilities, certain optimizations can be provided. For example, within each of the main iteration steps, parallel operations can be performed to accelerate the fingerprint update. For example, multiple containers or CMETAs can be updated in parallel. Similarly, multiple Lp segments can be updated simultaneously, as can content handles.

It is important to note that for this embodiment, the SHA-1 fingerprints must be safe to use to represent the old data structures during the update process. If not, it would not be possible to read back the user files.

In general, this embodiment also imposes some degree of space usage. For example, depending on system configuration, the update process may double the container space used, and utilize multiple fingerprint indexes simultaneously until update is complete. Furthermore, the Lp segment conversion may require a high number of SHA-1 to SHA-2 index lookups (which are each random I/Os), and this number increases with the logical size of the dataset. Process 700 represents a relatively straightforward and easily implemented fingerprint update solution, but may not be suitable for constrained systems.

Deleting While Upgrading

In order to overcome the constraints mentioned above with respect to space usage, embodiments include processing components to free space where possible while upgrading the fingerprints. In an embodiment, this process involves deleting an old container after it is processed, and deleting old Lp segments after an Lp segment is processed and the index structures for the new SHA2 version are updated.

FIG. 9 is a flowchart that illustrates a fingerprint updating process that deletes while updating, under some embodiments. It should be noted that many of the processing steps in process 900 of FIG. 9 are identical to those of process 700 of FIG. 7 with some additional steps for deleting while processing, as shown. Process 900 starts by iterating through the containers and calculating new SHA2 hashes for each segment, 902. The system generates new containers and records new hash versions in the CMETA structure, 904. After these steps, the old containers are deleted, 906. While creating SHA-2 hashes, the system creates a new index mapping from the SHA-1 hash to the SHA-2 hash, and creates a new fingerprint index mapping from the SHA-2 fingerprints to the container, 908.

The process 900 iterates through the Lp segments from L1 up towards L6. Each Lp segment has an array of fingerprints referencing the lower-level segments. For each fingerprint, the system looks it up in the SHA-1 to SHA-2 index, and generates a new Lp segment with SHA2 fingerprints, 910. The system then calculates a SHA-2 hash for the new Lp segment and adds an entry to the SHA-1 to SHA-2 index with the old and new Lp fingerprint, 912. At this point, the old Lp segments are deleted, 914, and if Lp segments are in containers, the container can be deleted once all of its Lp segments have been processed.

The system then stores the new Lp segment and update the SHA2 fingerprint index to the container location, 914. If the Lp segment is stored in a key-value store or other structure, those structures are also updated accordingly. The process then continues steps 710 to 714 as it iterates up towards the L6 segments. After the iterations over the containers and Lp segments, the system updates the content handles to reference the new L6 segments.

A final deletion step, such as step 718 can be included, however, after deletion steps 906 and 914, many of the unneeded structures will have already been deleted.

The embodiment of FIG. 9 explicitly includes in-process deletion steps 906 and 914 that performs deletes during the process of upgrading. This generally reduces space overheads over processes (such as process 700) that only delete as a final step. This embodiment may involve multiple indexes simultaneously, but it generally avoids having duplicate containers and Lp segments.

The system could be configured to disable reads while performing an upgrade under process 900 since the Lp segments will temporarily be in the SHA1 format while CMETAs are in SHA2 format until the end of step 910. Read support, however, could be enabled, in which case, when performing a read, if the Lp segment is in SHA2 format, the SHA2 fingerprint index can be checked to read segments. All Lp segments lower in the Lp tree should already be converted to SHA2 because of the upgrade from L1 up to L6. If the Lp segment is in SHA1 format, then the system can check the SHA1-to-SHA2 index and then check the SHA2 fingerprint index to read the L0 segments. As a read requires various Lp segments that are undergoing upgrade in step 910, some may be in SHA1 format and others in SHA2 format, and the appropriate read path should be followed.

As mentioned above, any current and future hash algorithm may be used for the fingerprint update process. Examples discuss the use of SHA-1 and SHA-2, but new hash algorithms are constantly being developed. One such new algorithm is the SHA-256 hashing algorithm that has been implemented in certain data reduction hardware to find duplicate data, and which is then stored as a single instance for multiple sources to share. This provides enhanced data efficiency while maintaining a long history of data integrity. The SHA-256 algorithm generates a 32-byte code for each 32 KB block of data. As an example, consider a system with 1 PB of written data with 5% updated per day. In 1 million years of operation, there is a 20% likelihood of a hash collision. As each 128 KB track is handled as 4 blocks of 32 KB there would need to be a hash collision on all four blocks in the same 128 KB track to have an actual hash collision. The odds of having all 4 collide makes this only theoretical (less than a 1% chance in a trillion years of operation). This illustrates but one example of the benefits of updating hash algorithms to the best version currently available as data protection and storage needs evolve.

As described above, in an embodiment, system 100 includes certain processes that may be implemented as a computer implemented software process, or as a hardware component, or both. As such, it may include executable modules executed by the one or more computers in the network, or embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 10:
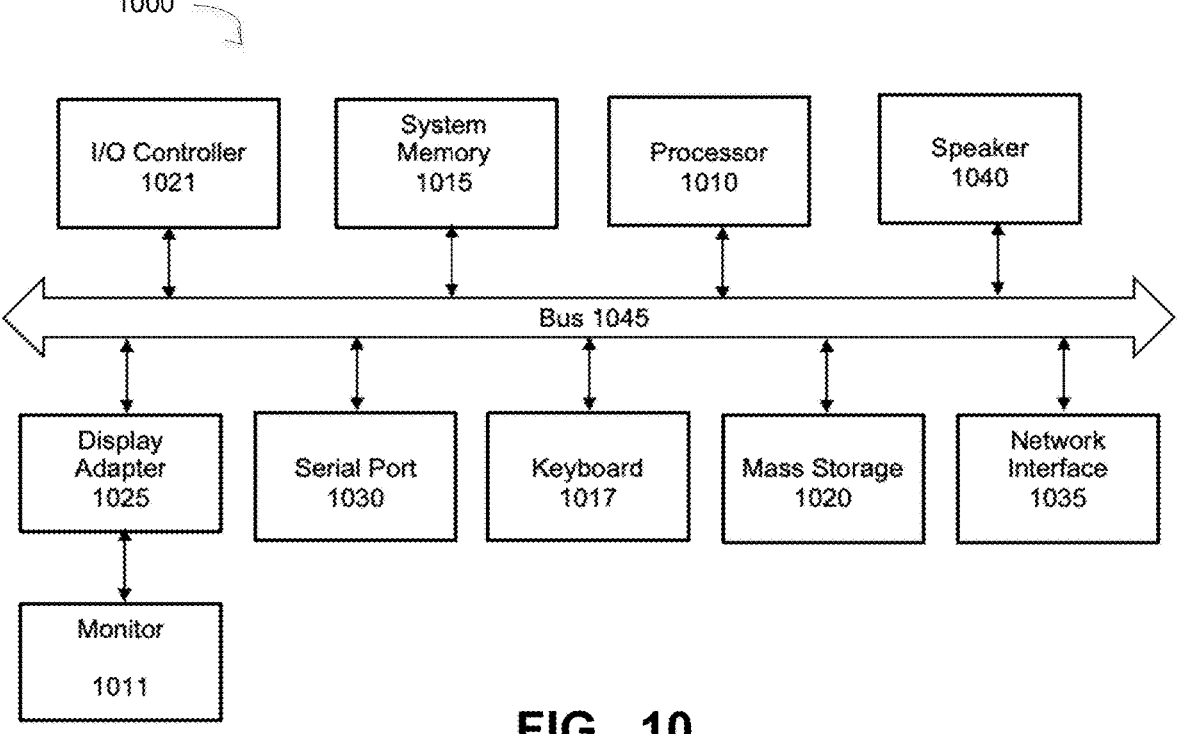
FIG. 10 is a block diagram of a computer system used to execute one or more software components of the processes described herein, under some embodiments.

FIG. 10 is a block diagram of a computer system used to execute one or more software components of the processes described herein, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules, or instantiated as distributed objects. The computer software products may also be component software. An operating system for the system may be one of the Microsoft Windows®. family of systems (e.g., Windows Server), Linux, Mac™ OS X, Unix, and so on.

Although certain embodiments have been described and illustrated with respect to certain example network topographies and node names and configurations, it should be understood that embodiments are not so limited, and any practical network topography is possible.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of updating fingerprints for deduplicated data segments in a cluster network utilizing containers to hold directory and files of a filesystem, comprising:

calculating, for each container in the cluster network, new fingerprint hash values using a new hash process that replaces an old hash process that generated current fingerprint hash values;

producing new containers as needed to store the new fingerprint hash values;

deleting old containers immediately after the new containers are produced;

creating a new index mapping from the old hash process to the new hash process, and a new fingerprint index mapping from the new hash process to the containers;

generating, by using the new fingerprint index, new fingerprints with the new hash process;

calculating the new fingerprint hash values of the new fingerprints using the new hash process;

deleting old fingerprints immediately after the calculating step; and updating relevant data structures using the old fingerprint hash values with the new fingerprint hash values, wherein the cluster network comprises a Santorini network processing containerized data utilizing a Kubernetes-based framework, and wherein the containerized data comprises deduplicated backup data processed by a deduplicated backup filesystem.

2. The method of claim 1 further comprising calculating a space requirement to complete the updating of the fingerprints.

3. The method of claim 1 further comprising:

updating content handles to references with the new fingerprints;

first deleting containers with the data segments fingerprinted with the old hash process;

second deleting a fingerprint index referencing the old hash process;

third deleting the new fingerprint index; and fourth deleting old data segments fingerprinted with the old hash process.

4. The method of claim 1 wherein the relevant data structures comprise a container metadata section of each container, the new fingerprint index, and a file recipe for the files of the filesystem.

5. The method of claim 4 wherein a fingerprint for each respective data segment is generated using a secure hash (SH) cryptographic hash algorithm, and wherein the fingerprints are stored in a L0 to L6 layered segment tree with the data segments stored in the L0 layer.

6. The method of claim 5 further comprising iterating the calculation of the new fingerprint hash values of the new data segments using the new hash process over each of the L0 to L6 layers.

7. A system updating fingerprints for deduplicated data segments in a cluster network utilizing containers to hold directory and files of a filesystem, comprising:

a hardware-based calculator calculating, for each container in the cluster network, new fingerprint hash values using a new hash process that replaces an old hash process that generated old fingerprint hash values;

a hardware based system component producing new containers as needed to store the new fingerprint hash values and deleting old containers immediately after the new containers are produced;

a new index mapping component creating a new index mapping from the old hash process to the new hash process, and a new fingerprint index mapping from the new hash process to the containers, and generating, by using the new fingerprint index, new fingerprints with the new fingerprint hash;

the hardware-based calculator calculating the new fingerprint hash values of the new data segments using the new hash process, the system component deleting old fingerprints immediately after the new fingerprints are generated;

an updater updating relevant data structures using the old fingerprint hash values with the new fingerprint hash values; and a component calculating a space requirement to complete the updating of the fingerprints, wherein the space requirement calculation utilizes variables related to a logical size (L) of user-written content, a physical size (P) of the data after deduplication without indexes and metadata, a total size (TP) of the data after deduplication with the indexes and metadata, and a data segment size.

8. The system of claim 7 further comprising the updater updating content handles to references with the new data segments.

9. The system of claim 8 further comprising a cleanup component deleting: containers with the data segments fingerprinted with the old hash process, a fingerprint index referencing the old hash process, the new fingerprint index, and old data segments fingerprinted with the old hash process.

10. The system of claim 7 wherein the relevant data structures comprise a container metadata section of each container, the new fingerprint index, and a file recipe for the files of the filesystem.

11. The system of claim 10 wherein a fingerprint for each respective data segment is generated using a secure hash (SH) cryptographic hash algorithm, and wherein the fingerprints are stored in a L0 to L6 layered segment tree with the data segments stored in the L0 layer.

12. The system of claim 11 further comprising the hardware-based calculator iterating the calculation of the new fingerprint hash values of the new data segments using the new hash process over each of the L0 to L6 layers.

13. The system of claim 12 wherein the cluster network comprises a Santorini network processing containerized data utilizing a Kubernetes-based framework, and wherein the containerized data comprises deduplicated backup data processed by a deduplicated backup filesystem.

14. A method of updating fingerprints for deduplicated data segments in a cluster network utilizing containers to hold directory and files of a filesystem, comprising:

calculating, for each container in the cluster network, new fingerprint hash values using a new hash process that replaces an old hash process that generated current fingerprint hash values;

creating a new index mapping from the old hash process to the new hash process, and a new fingerprint index mapping from the new hash process to the containers;

calculating a space requirement to update the fingerprints on at least one of a temporary or long-term basis due to increased program code size and addition of data elements;

calculating the new fingerprint hash values of the new fingerprints using the new hash process; and updating relevant data structures using the old fingerprint hash values with the new fingerprint hash values, wherein the space requirement calculation utilizes variables related to a logical size (L) of user-written content, a physical size (P) of the data after deduplication without indexes and metadata, a total size (TP) of the data after deduplication with the indexes and metadata, and a data segment size.

15. The method of claim 14 further comprising updating content handles to references with the new data segments.

16. The method of claim 14 wherein the space requirement for the long-term basis is approximated by adding a size of the new index with a size of the data elements, and wherein the size of the new index is larger than an old index as a function of the old index size, and the size of the data elements is larger than a size of old data elements as a function of the old data elements size.

17. The method of claim 16 wherein the temporary basis for the space requirement space required to update from the old hash process to the new hash process during the updating step, and that can be regained after completion.

\* \* \* \* \*